(12) United States Patent
Yue et al.

(10) Patent No.: US 11,706,746 B2
(45) Date of Patent: Jul. 18, 2023

(54) METHOD AND TERMINAL FOR CONTROLLING BANDWIDTH PART INACTIVITY TIMER

(71) Applicant: VIVO MOBILE COMMUNICATION CO., LTD., Dongguan (CN)

(72) Inventors: Ran Yue, Dongguan (CN); Xiaodong Yang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 116 days.

(21) Appl. No.: 17/033,902

(22) Filed: Sep. 27, 2020

(65) Prior Publication Data
US 2021/0014862 A1 Jan. 14, 2021

Related U.S. Application Data

(63) Continuation of application No. PCT/CN2019/075679, filed on Feb. 21, 2019.

(30) Foreign Application Priority Data

Mar. 30, 2018 (CN) .......................... 201810286236.4

(51) Int. Cl.
*H04W 72/04* (2023.01)
*H04W 72/0453* (2023.01)

(52) U.S. Cl.
CPC .............................. *H04W 72/0453* (2013.01)

(58) Field of Classification Search
None
See application file for complete search history.

(56) References Cited

U.S. PATENT DOCUMENTS

| 2018/0279358 A1* | 9/2018 | Babaei ................. H04W 72/14 |
| 2019/0132109 A1* | 5/2019 | Zhou ....................... H04L 5/001 |
| 2020/0295913 A1* | 9/2020 | Takeda .............. H04W 72/0453 |
| 2020/0351638 A1* | 11/2020 | Kim ....................... H04W 8/005 |
| 2021/0058218 A1* | 2/2021 | Harada ................... H04L 5/001 |

FOREIGN PATENT DOCUMENTS

CN 102104465 A 6/2011

OTHER PUBLICATIONS

International Search Report issued in corresponding International Application No. PCT/CN2019/075679, dated May 7, 2019, 4 pages.
First Office Action issued in related Chinese application No. 201810286236.4, dated Apr. 2, 2020, 7 pages.
ASUSTek, "ASUSTek Details of BWP inactivity timer", 3GPP TSG RAN WG2 Meeting #100 R2-1712212, Nov. 16, 2017.
Qualcomm, "Dormant BWP for fast Scell activation", 3GPP TSG RAN WG2 Meeting #101 R2-1803564, Feb. 16, 2018.

* cited by examiner

*Primary Examiner* — Saba Tsegaye
(74) *Attorney, Agent, or Firm* — IPX PLLC (57) ABSTRACT

This disclosure provides a method for controlling a bandwidth part inactivity timer and a terminal thereof. The method comprises: determining a work switching state of a secondary cell for which a Bandwidth Part (BWP) is configured; and disabling, by a terminal when the work switching state switches from an activated state to a non-activated state, a bandwidth part inactivity timer corresponding to a BWP currently activated on the secondary cell.

20 Claims, 3 Drawing Sheets

---

Determine a work switching state of a Scell for which a BWP is configured — 31

When the work switching state switches from the activated state to the non-activated state, the terminal disables a bandwidth part activation timer corresponding to the BWP currently activated on the Scell — 32

METHOD AND TERMINAL FOR CONTROLLING BANDWIDTH PART INACTIVITY TIMER

CROSS-REFERENCE TO RELATED APPLICATIONS

This application is a bypass continuation of PCT Application No. PCT/CN2019/075679 filed Feb. 21, 2019, which claims priority to Chinese Patent Application No. 201810286236.4 filed in China on Mar. 30, 2018, both of which are incorporated herein by reference in their entireties.

TECHNICAL FIELD

The present disclosure relates to the field of communications technologies, and in particular, to a method for controlling a bandwidth part inactivity timer and a terminal thereof.

BACKGROUND

Currently, a Carrier Aggregation (CA) technology is introduced in a Long Term Evolution (LTE) system. In the CA technology, User Equipment (UE) is connected to a network for communication by using multiple cells, where one of the multiple cells is a Primary Cell (Pcell), and another cell is a Secondary Cell (Scell). The Scell includes an activated state and a deactivated state, and the Pcell does not include a deactivated state and always maintains an activated state.

Currently, for the Scell in CA, the following several processes are started in an activation process through configuration:

sending a Sounding Reference Signal (SRS) on the Scell (SRS transmissions on the Scell);

reporting Channel Quality Indicator (CQI)/Precoding Matrix Indicator (PMI)/Rank Indicator (RI)/Precoding Type Indicator (PTI)/Channel State Information Reference Signals Resource Indicator (CRI) information for the Scell (CQI/PMI/RI/PTI/CRI reporting for the Scell);

monitoring a Physical Downlink Control Channel (PDCCH) on the current Scell (PDCCH monitoring on the Scell);

monitoring a PDCCH for the current Scell (PDCCH monitoring for the Scell);

if a Physical Uplink Control Channel (PUCCH) is configured on the current Scell, sending the PUCCH on the current Scell (PUCCH transmissions on the Scell, if configured);

starting or restarting a deactivation timer of the Scell (start or restart the Scell Deactivation Timer associated with the Scell); and triggering a Power Headroom Report (PHR) (trigger PHR).

An activation/deactivation mechanism of the Scell is implemented based on a combination of an activation/deactivation Media Access Control Control Element (MAC CE) and deactivation timers.

A Scell activation/deactivation operation based on a MAC CE is controlled by an eNodeB, and a Scell deactivation operation based on a deactivation timer is controlled by UE (user equipment or a terminal).

Figure 1:
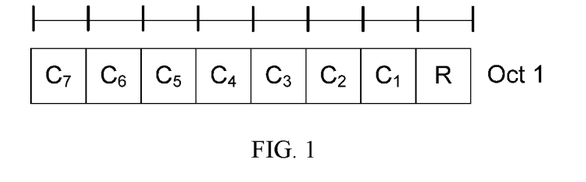
FIG. 1 shows a signaling format of a one-byte MAC CE for activation or deactivation.
Figure 2:
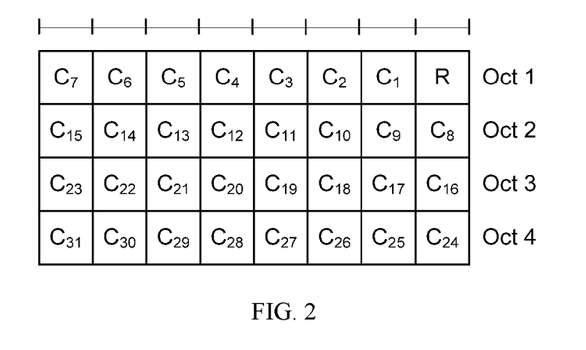
FIG. 2 shows a signaling format of a four-byte MAC CE for activation or deactivation.

1. Scell Activation/Deactivation Based on a MAC CE:

A MAC CE format for activation/deactivation is shown in FIG. 1 and FIG. 2. Logical Channel (LC) IDs of a corresponding MAC subheader are respectively 11011 and 11000.

$C_i$ corresponds to an activated/deactivated state of a Scell with Scell Index-r10 configured as i.

If $C_i$ is set to 1, it indicates that a corresponding Scell is activated. If $C_i$ is set to 0, it indicates that a corresponding Scell is deactivated.

2. Scell Deactivation Based on a Deactivation Timer:

UE maintains a deactivation timer (Scell Deactivation Timer) corresponding to all Scells of the UE, and the Scell deactivation timer has a same value. This value may be configured as "infinity", that is, Scell deactivation based on the timer is disabled. In this case, the UE cannot control Scell deactivation.

When the UE receives no data or PDCCH message on a corresponding Scell within a time indicated by the deactivation timer, the Scell is deactivated.

Under the foregoing precondition, because switching from the deactivated state to the activated state has a relatively large delay, a new state (Scell dormant state) is introduced to reduce the delay. The new state has the following characteristics: No L1 signaling is introduced in state switching; a CQI is periodically reported only based on a Cell Reference Signal (CRS); and no PDCCH is monitored.

In addition, switching between the new state and the activated state or the deactivated state may be controlled by a MAC CE. It is determined that a concept of Bandwidth Part (BWP) is introduced in a New Radio (NR) system, where one or more BWPs may be configured for a serving cell. A BWP is activated and deactivated through BWP switching. In addition, a bandwidth part inactivity timer is introduced, and is configured to: control the UE to autonomously switch to a default BWP when the UE is not scheduled to send/receive data or not instructed by PDCCH signaling to perform BWP switching within a period of time. When the UE is scheduled to send/receive data, or is instructed by PDCCH signaling to perform BWP switching, the timer is started.

In this case, when the Scell switches to the new state and a BWP is configured for the Scell, an operation manner of the bandwidth part inactivity timer corresponding to the BWP is indefinite currently.

SUMMARY

An embodiment of the present disclosure provides a method for controlling a bandwidth part inactivity timer and a terminal, to resolve the problem in the related technologies that an operation manner of a bandwidth part inactivity timer corresponding to a BWP is indefinite.

According to a first aspect, an embodiment of the present disclosure provides a method for controlling a bandwidth part inactivity timer, including:

determining a work switching state of a secondary cell for which a BWP is configured; and disabling, by a terminal when the work switching state switches from an activated state to a non-activated state, a bandwidth part inactivity timer corresponding to a BWP currently activated on the secondary cell.

According to a second aspect, an embodiment of the present disclosure further provides a terminal, including:

a determining module, configured to determine a work switching state of a secondary cell for which a BWP is configured; and a processing module, configured to: when the work switching state switches from an activated state to a non-activated state, disable a bandwidth part inactivity timer corresponding to a BWP currently activated on the secondary cell.

According to a third aspect, an embodiment of the present disclosure further provides a terminal, including a processor, a memory, and a program that is stored in the memory and may run on the processor, where when the program is executed by the processor, the steps in the method for controlling a bandwidth part inactivity timer are performed.

According to a fourth aspect, an embodiment of the present disclosure provides a computer readable storage medium, where the computer readable storage medium stores a program, and when the program is executed by the processor, the steps in the method for controlling a bandwidth part inactivity timer are performed.

In this way, in the method for controlling a bandwidth part inactivity timer in the embodiments of the present disclosure, the work switching state of the secondary cell for which the BWP is configured is first determined, and when the work switching state switches from the activated state to the non-activated state, the terminal disables the bandwidth part inactivity timer corresponding to the BWP currently activated on the secondary cell. Therefore, an operation manner of the bandwidth part inactivity timer corresponding to the BWP is definite.

DETAILED DESCRIPTION

The following describes exemplary embodiments of the present disclosure in further detail with reference to accompanying drawings. Although the accompanying drawings show exemplary embodiments of the present disclosure, it should be understood that the present disclosure may be implemented in various manners and shall not be limited to the embodiments described herein. On the contrary, these embodiments are provided to understand the present disclosure more thoroughly and allow a person skilled in the art to entirely comprehend the scope of the present disclosure.

In the specification and claims of this application, terms such as "first" and "second" are used for distinguishing similar objects, and are not necessarily used to describe a particular order or sequence. It should be understood that such used data is exchangeable in a proper case, so that the embodiments of the present disclosure described herein, for example, can be implemented in sequences other than those shown in the figures or described herein. In addition, terms "include" and "comprise" and any variation thereof are intended to cover non-exclusive inclusion. For example, processes, methods, systems, products, or devices including a series of steps or units are not necessarily limited to these clearly listed steps or units, and instead may include other steps or units not clearly listed or inherent to these processes, methods, products, or devices. "One of A, B, and C" and "A, B, or C" are intended to include any one of A, B, and C.

Figure 3:
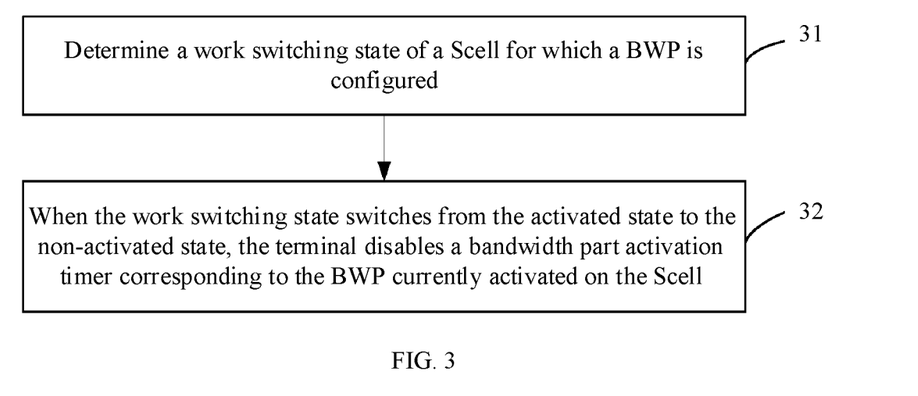
FIG. 3 is a schematic flowchart of a method for controlling a bandwidth part inactivity timer according to an embodiment of the present disclosure.

As shown in FIG. 3, an embodiment of the present disclosure provides a method for controlling a bandwidth part inactivity timer, including step 31 and step 32.

Step 31: Determine a work switching state of a Scell for which a BWP is configured. During specific implementation, when a terminal receives state switching signaling of the secondary cell or a timer for controlling state switching of the secondary cell expires, the work switching state of the Scell for which the BWP is configured is determined.

Herein, the state switching signaling of the Scell may be delivered by a network device and may be specifically MAC CE signaling sent by the network device, and indicates state switching of the Scell, for example, an activated state being switched to a deactivated state.

Herein, the timer for controlling state switching of the Scell may be controlled by the terminal. For example, when the timer expires, the Scell switches from an activated state to a deactivated state.

Certainly, herein, the work switching state of the Scell may be alternatively controlled by another device or other signaling or may be implemented in another manner.

Step 32: When the work switching state switches from the activated state to the non-activated state, the terminal disables a bandwidth part inactivity timer corresponding to the BWP currently activated on the Scell. Herein, the non-activated state may include all states, for example, a new state or a deactivated state of the Scell except the activated state. The new state is specifically a new state (Dormant Scell state) introduced for the Scell, and is between the activated state and the deactivated state. In the new state, no L1 signaling is introduced in state switching, a CQI is allowed to be periodically reported based on a reference signal, and no PDCCH is monitored. For example, the new state may be introduced in a 5G system.

In this embodiment, when the work switching state switches from the activated state to the non-activated state, the terminal disables the bandwidth part inactivity timer corresponding to the BWP currently activated on the Scell. Therefore, an operation manner of the bandwidth part inactivity timer is definite.

Figure 4:
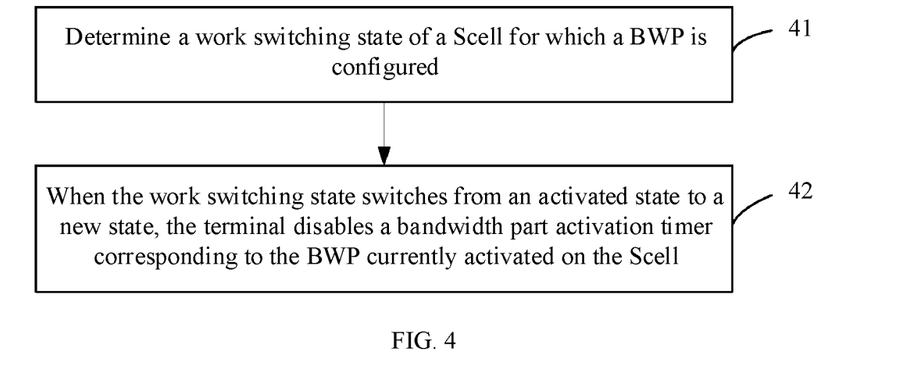
FIG. 4 is a schematic flowchart of a method for controlling a bandwidth part inactivity timer according to another embodiment of the present disclosure.

As shown in FIG. 4, an embodiment of the present disclosure provides a method for controlling a bandwidth part inactivity timer, including step 41 and step 42.

Step 41: Determine a work switching state of a Scell for which a BWP is configured. In this step, an implementation of the work switching state is the specific implementation of step 31 in the foregoing embodiment. Details are not described herein again.

Step 42: When the work switching state switches from an activated state to a new state, the terminal disables a bandwidth part inactivity timer corresponding to the BWP currently activated on the Scell.

Specifically, when the work switching state switches from the activated state to the new state, if the currently activated BWP is not a default BWP, the terminal stops the bandwidth part inactivity timer corresponding to the BWP currently activated on the Scell, or waits for expiration of the bandwidth part inactivity timer corresponding to the BWP currently activated on the Scell, or sets, as expiration, the bandwidth part inactivity timer corresponding to the BWP currently activated on the Scell.

In this embodiment, the bandwidth part inactivity timer corresponding to the currently activated BWP is configured by a network device. The network device configures a timer for each configured BWP, or may configure a timer for UE, where the timer has a same function as that of the bandwidth part inactivity timer. The bandwidth part inactivity timer is configured to control the UE to switch to a default BWP if the terminal obtains no scheduling transmission instruction, or performs no unscheduled sending or receiving, or receives no bandwidth part switching control signaling within specified duration of the bandwidth part inactivity timer corresponding to the currently activated BWP (a non-default BWP). In other words, the default BWP herein is a BWP to which the terminal switches if the terminal obtains no scheduling transmission instruction, or performs no unscheduled sending or receiving, or receives no bandwidth part switching control signaling within the specified duration of the bandwidth part inactivity timer corresponding to the currently activated BWP.

When the UE receives Scell state switching signaling on the activated Scell or the timer for controlling Scell state switching expires, switching to the new state is required. Herein, the new state has a same meaning as that of the new state in the foregoing embodiment.

If the currently activated BWP of the UE is not a default BWP, that is, the bandwidth part inactivity timer corresponding to the activated BWP may be in a working state, the UE stops the bandwidth part inactivity timer corresponding to the BWP currently activated on the Scell, or waits for expiration of the bandwidth part inactivity timer corresponding to the BWP currently activated on the Scell, or sets, as expiration, the bandwidth part inactivity timer corresponding to the BWP currently activated on the Scell.

Herein, stopping the bandwidth part inactivity timer may be, for example, disabling the bandwidth part inactivity timer. Setting, as expiration, the bandwidth part inactivity timer corresponding to the BWP currently activated on the Scell may be, for example, directly resetting a current working state of the bandwidth part inactivity timer, where a state after resetting is an expiration state.

In this embodiment, when the work switching state switches from the activated state to the new state, the terminal disables the bandwidth part inactivity timer corresponding to the BWP currently activated on the Scell. Therefore, an operation manner of the bandwidth part inactivity timer is definite.

Figure 5:
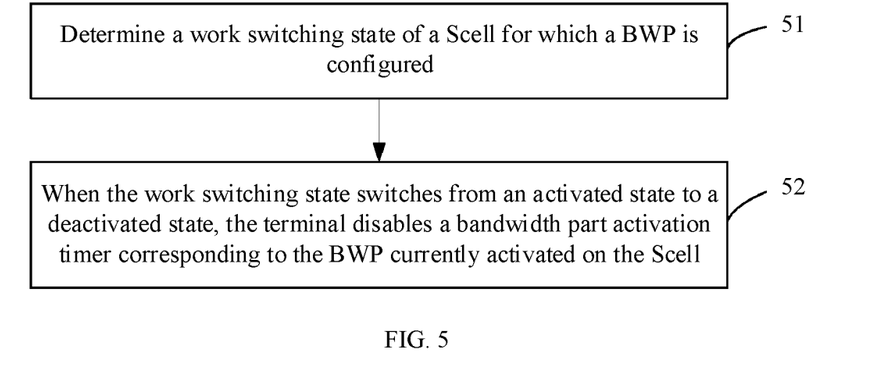
FIG. 5 is a schematic flowchart of a method for controlling a bandwidth part inactivity timer according to still another embodiment of the present disclosure.

As shown in FIG. 5, an embodiment of the present disclosure provides a method for controlling a bandwidth part inactivity timer, including step 51 and step 52.

Step 51: Determine a work switching state of a Scell for which a BWP is configured. In this step, an implementation of the work switching state is the specific implementation of step 31 in the foregoing embodiment. Details are not described herein again.

Step 52: When the work switching state switches from an activated state to a deactivated state, the terminal disables a bandwidth part inactivity timer corresponding to the BWP currently activated on the Scell.

Specifically, when the work switching state switches from the activated state to the deactivated state, if the currently activated BWP is not a default BWP, the terminal waits for expiration of the bandwidth part inactivity timer corresponding to the BWP currently activated on the Scell, or sets, as expiration, the bandwidth part inactivity timer corresponding to the BWP currently activated on the Scell.

In this embodiment, the bandwidth part inactivity timer corresponding to the currently activated BWP is configured by a network device. The network device configures a timer for each configured BWP, or may configure a timer for UE, where the timer has a same function as that of the bandwidth part inactivity timer. The bandwidth part inactivity timer is configured to control the UE to switch to a default BWP if the terminal obtains no scheduling transmission instruction, or performs no unscheduled sending or receiving, or receives no bandwidth part switching control signaling within specified duration of the bandwidth part inactivity timer corresponding to the currently activated BWP (a non-default BWP). In other words, the default BWP herein is a BWP to which the terminal switches if the terminal obtains no scheduling transmission instruction, or performs no unscheduled sending or receiving, or receives no bandwidth part switching control signaling within the specified duration of the bandwidth part inactivity timer corresponding to the currently activated BWP.

When the UE receives Scell state switching signaling on the activated Scell or the timer for controlling Scell state switching expires, switching to the deactivated state is required.

If the currently activated BWP of the UE is not a default BWP, that is, the bandwidth part inactivity timer corresponding to the activated BWP may be in a working state, the terminal waits for expiration of the bandwidth part inactivity timer corresponding to the BWP currently activated on the Scell, or sets, as expiration, the bandwidth part inactivity timer corresponding to the BWP currently activated on the Scell.

Herein, setting, as expiration, the bandwidth part inactivity timer corresponding to the BWP currently activated on the Scell may be, for example, directly resetting a current working state of the bandwidth part inactivity timer, where a state after resetting is an expiration state.

In this embodiment, when the work switching state switches from the activated state to the deactivated state, the terminal disables the bandwidth part inactivity timer corresponding to the BWP currently activated on the Scell. Therefore, an operation manner of the bandwidth part inactivity timer is definite.

The foregoing embodiments of the present disclosure separately provide solutions of processing of an operation manner of the bandwidth part inactivity timer when the Scell switches from the activated state to the deactivated state, for example, switches from the activated state to the new state or switches from the activated state to the deactivated state. Therefore, the terminal can control the bandwidth part inactivity timer when the Scell is in the new state or the deactivated state.

Figure 6:
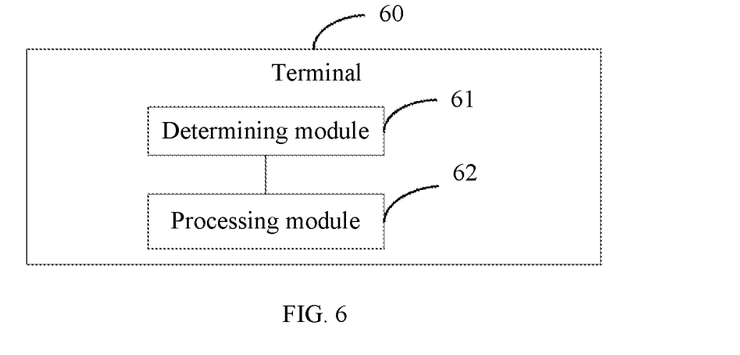
FIG. 6 is a block diagram of modules of a terminal according to an embodiment of the present disclosure.

As shown in FIG. 6, a terminal 60 in an embodiment of the present disclosure can implement various details of the foregoing method embodiments, and achieve the same effect. The terminal 60 specifically includes the following function modules:

a determining module 61, configured to determine a work switching state of a secondary cell for which a BWP is configured; and a processing module 62, configured to: when the work switching state switches from the activated state to the non-activated state, disable a bandwidth part inactivity timer corresponding to the BWP currently activated on the secondary cell.

Figure 7:
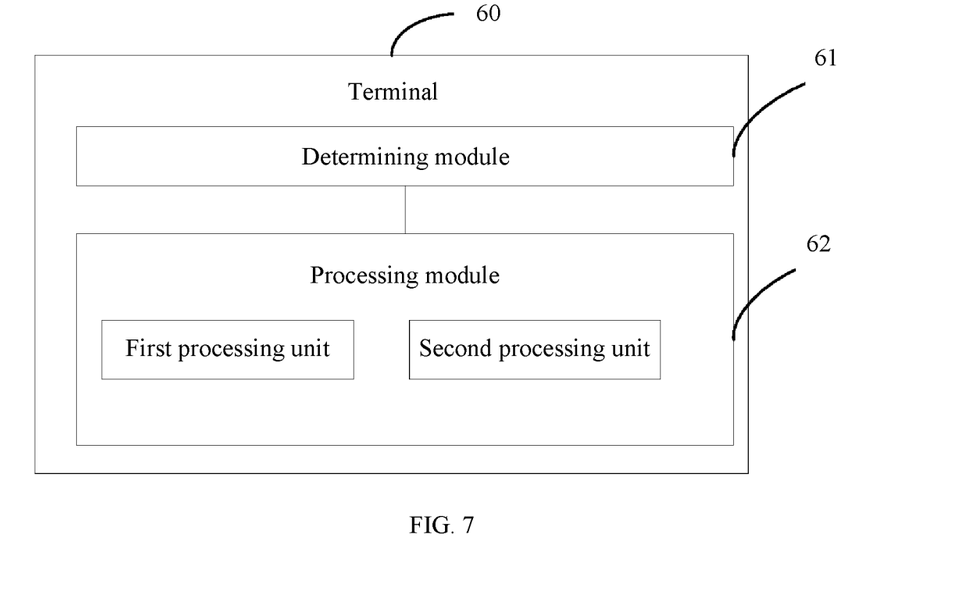
FIG. 7 is another block diagram of modules of a terminal according to an embodiment of the present disclosure.

As shown in FIG. 7, the processing module 62 includes:

a first processing unit, configured to: when the work switching state switches from an activated state to a new state, disable a bandwidth part inactivity timer corresponding to the BWP currently activated on the secondary cell; and a second processing unit, configured to: when the work switching state switches from an activated state to a deactivated state, disable a bandwidth part inactivity timer corresponding to the BWP currently activated on the secondary cell.

The first processing unit is specifically configured to: when the work switching state switches from the activated state to the new state, if the currently activated BWP is not a default BWP, stop the bandwidth part inactivity timer corresponding to the BWP currently activated on the secondary cell, or wait for expiration of the bandwidth part inactivity timer corresponding to the BWP currently activated on the secondary cell, or set, as expiration, the bandwidth part inactivity timer corresponding to the BWP currently activated on the secondary cell.

The second processing unit is specifically configured to: when the work switching state switches from the activated state to the deactivated state, if the currently activated BWP is not a default BWP, wait for expiration of the bandwidth part inactivity timer corresponding to the BWP currently activated on the secondary cell, or set, as expiration, the bandwidth part inactivity timer corresponding to the BWP currently activated on the secondary cell.

The determining module 61 is specifically configured to: when state switching signaling of the secondary cell is received or a timer for controlling state switching of the secondary cell expires, determine the work switching state of the secondary cell for which the BWP is configured.

The processing module 62 is further configured to switch to a default BWP if no scheduling transmission instruction is obtained, or no unscheduled sending or receiving is performed, or no bandwidth part switching control signaling is received within specified duration of the bandwidth part inactivity timer corresponding to the currently activated BWP.

The bandwidth part inactivity timer corresponding to the currently activated BWP is configured by a network device.

Figure 8:
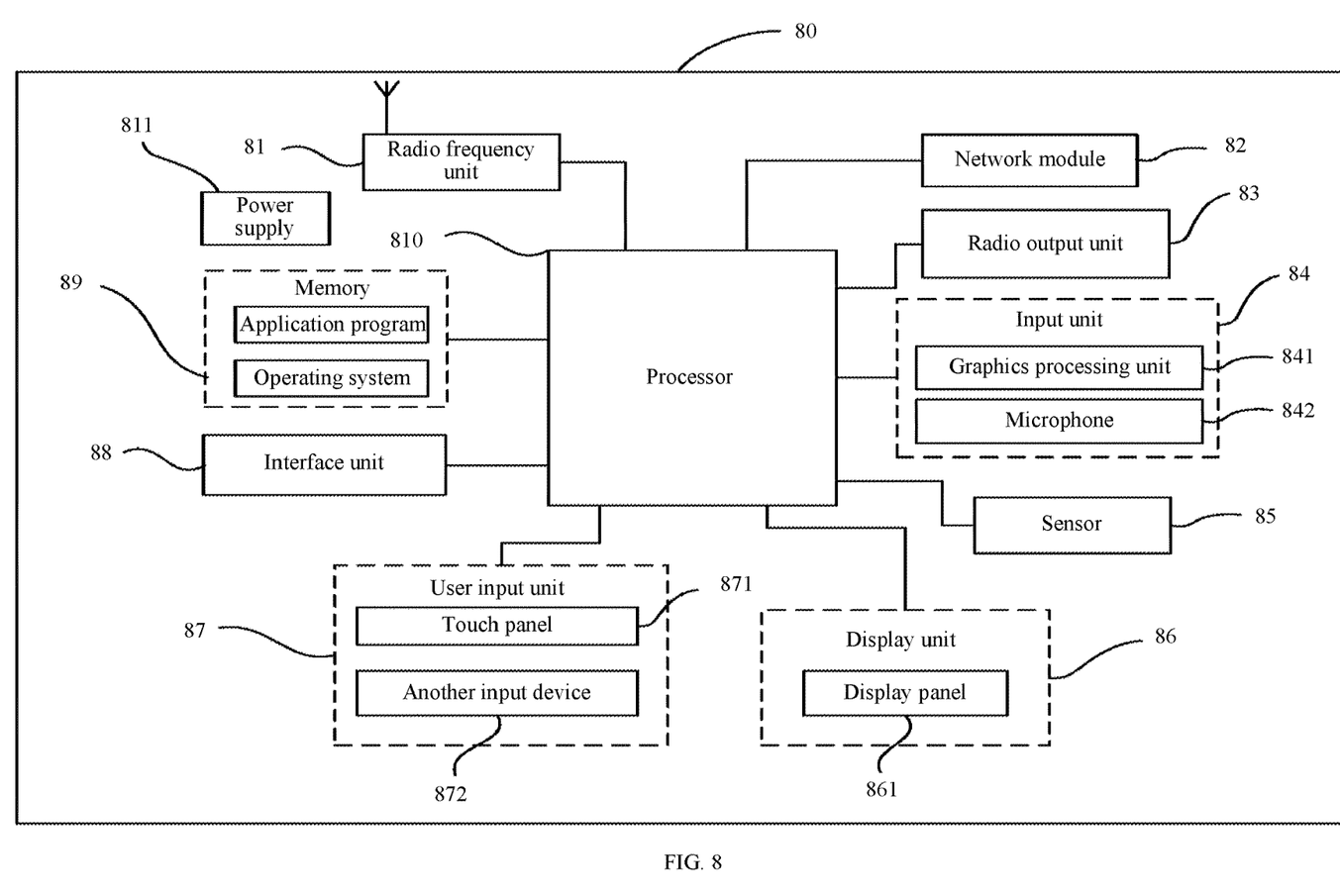
FIG. 8 is a schematic architectural diagram of a terminal according to an embodiment of the present disclosure.

To better achieve the foregoing objective, further, FIG. 8 is a schematic structural diagram of hardware of a terminal for implementing the various embodiments of the present disclosure. The terminal 80 includes, but is not limited to: components such as a radio frequency unit 81, a network module 82, an audio output unit 83, an input unit 84, a sensor 85, a display unit 86, a user input unit 87, an interface unit 88, a memory 89, a processor 810, and a power supply 811. It can be understood by a person skilled in the art that the structure of the terminal shown in FIG. 8 does not constitute a limitation on the terminal, and the terminal may include more or fewer components than those shown in the figure, or combine some components, or have different component arrangements. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 810 is configured to: determine a work switching state of a secondary cell for which a BWP is configured; and when the work switching state switches from the activated state to the non-activated state, disable a bandwidth part inactivity timer corresponding to the BWP currently activated on the secondary cell.

This embodiment of the present disclosure separately provides solutions of processing of an operation manner of the bandwidth part inactivity timer when the Scell switches from the activated state to the deactivated state, for example, switches from the activated state to the new state or switches from the activated state to the deactivated state. Therefore, the terminal can control the bandwidth part inactivity timer when the Scell is in the new state or the deactivated state.

It should be understood that in this embodiment of the present disclosure, the radio frequency unit 81 may be configured to receive and send signals in a process of receiving and sending information or calling. Specifically, the radio frequency unit 81 receives downlink data from a base station for processing by the processor 810, and sends uplink data to the base station. Generally, the radio frequency unit 81 includes, but is not limited to, an antenna, at least one amplifier, a transceiver, a coupler, a low noise amplifier, a duplexer, and the like. In addition, the radio frequency unit 81 may further communicate with a network and other devices through a wireless communications system.

The terminal provides wireless broadband Internet access to a user through the network module 82, for example, helps the user receive and send e-mails, browse web pages, and access streaming media.

The audio output unit 83 may convert audio data received by the radio frequency unit 81 or the network module 82 or stored in the memory 89 into an audio signal, and output the audio signal as sound. Moreover, the audio output unit 83 may further provide audio output (for example, call signal receiving sound and message receiving sound) related to a specific function performed by the terminal 80. The audio output unit 83 includes a speaker, a buzzer, a receiver, and the like.

The input unit 84 is configured to receive an audio signal or a video signal. The input unit 84 may include a Graphics Processing Unit (GPU) 841 and a microphone 842.

The GPU 841 processes image data of a still picture or a video obtained by an image capturing apparatus (such as a camera) in a video capturing mode or an image capturing mode. A processed image frame may be displayed on the display unit 86. The image frame processed by the GPU 841 may be stored in the memory 89 (or another storage medium) or sent through the radio frequency unit 81 or the network module 82. The microphone 842 can receive sound and can process such sound into audio data. The processed audio data can be converted into format output that can be sent to a mobile communications base station through the radio frequency unit 81 in a telephone call mode.

The terminal 80 further includes at least one sensor 85, such as a light sensor, a motion sensor, and other sensors. Specifically, the light sensor includes an ambient light sensor and a proximity sensor, where the ambient light sensor can adjust brightness of the display panel 861 based on brightness of ambient light, and the proximity sensor can turn off the display panel 861 and/or backlight when the terminal 80 moves towards the ear. As a category of the motion sensor, an accelerometer sensor can detect accelerations in all directions (generally three axes), and can detect the magnitude and direction of gravity when it is still. The accelerometer sensor may be configured to identify a terminal gesture (for example, switching between a landscape mode and a portrait mode, related games, and magnetometer gesture calibration), perform vibration identification-related functions (for example, a pedometer and tapping), and the like. The sensor 85 may also include a fingerprint sensor, a pressure sensor, an iris sensor, a molecular sensor, a gyroscope, a barometer, a hygrometer, a thermometer, an infrared sensor, and the like. Details are not described herein again.

The display unit 86 is configured to display information input by a user or information provided to a user. The display unit 86 may include a display panel 861, and the display panel 861 may be configured in a form of Liquid Crystal Display (LCD), Organic Light-Emitting Diode (OLED), or the like.

The user input unit 87 may be configured to receive inputted digit or character information and generate key signal input related to user setting and function control of the terminal. Specifically, the user input unit 87 includes a touch panel 871 and another input device 872. The touch panel 871 is also referred to as a touch screen, and can collect a touch operation on or near the touch panel 871 by a user (for example, an operation on or near the touch panel 871 by the user with any suitable object or accessory such as a finger or a stylus). The touch panel 871 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 810, and receives and executes a command from the processor 810. In addition, the touch panel 871 can be implemented by using multiple types such as a resistance type, a capacitance type, infrared rays, and surface acoustic waves. In addition to the touch panel 871, the user input unit 87 may also include another input device 872. Specifically, the another input device 872 may include, but is not limited to, a physical keyboard, functional keys (for example, a volume control key and a switch key), a trackball, a mouse, and a joystick. Details are not described herein again.

Further, the touch panel 871 may cover the display panel 861. When the touch panel 871 detects a touch operation on or near the touch panel 871, the touch operation is transmitted to the processor 810 to determine a type of a touch event, and then the processor 810 provides a corresponding visual output on the display panel 861 based on the type of the touch event. Although in FIG. 8, the touch panel 871 and the display panel 861 are two independent components for implementing input and output functions of the terminal, in some embodiments, the touch panel 871 and the display panel 861 may be integrated to implement the input and output functions of the terminal. Details are not limited herein.

The interface unit 88 is an interface connecting an external apparatus to the terminal 80. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 88 may be configured to receive input (for example, data information and power) from an external apparatus and transmit the received input to one or more elements in the terminal 80, or may be configured to transmit data between the terminal 80 and the external apparatus.

The memory 89 may be configured to store software programs and various data. The memory 89 may mainly include a program storage area and a data storage area. The program storage area may store an operating system, an application program required by at least one function (for example, a sound playing function and an image playing function), and the like. The data storage area may store data (for example, audio data and a phonebook) created based on use of the mobile phone, and the like. In addition, the memory 89 may include a high-speed random access memory or a non-volatile memory, for example, at least one disk storage device, a flash memory, or another volatile solid-state storage device.

The processor 810 is a control center of the terminal. The processor 810 uses various interfaces and circuits to connect the various parts of the entire terminal, and performs various functions of the terminal and processes data by running or executing software programs and/or modules stored in the memory 89 and invoking data stored in the memory 89, to monitor the terminal as a whole. The processor 810 may include one or more processing units. Optionally, the processor 810 may integrate an application processor and a modem processor. The application processor mainly deals with an operating system, a user interface, an application program, and the like. The modem processor mainly deals with wireless communication. It can be understood that alternatively, the modem processor may not be integrated into the processor 810.

The terminal 80 may also include a power supply 811 (for example, a battery) that supplies power to various components. Optionally, the power supply 811 may be logically connected to the processor 810 through a power supply management system, to perform functions of managing charging, discharging, and power consumption through the power supply management system.

In addition, the terminal 80 includes some function modules not shown. Details are not described herein again.

Optionally, an embodiment of the present disclosure also provides a terminal, including a processor 810, a memory 89, and a computer program that is stored in the memory 89 and can run on the processor 810. When the computer program is executed by the processor 810, various processes of the embodiments of the method for controlling the bandwidth part inactivity timer are performed, and the same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a Radio Access Network (RAN). The wireless terminal may be a mobile terminal, such as a mobile phone (or referred to as a "cellular" phone) and a computer with a mobile terminal, and may be, for example, a portable, pocket, handheld, computer built-in, or vehicle-mounted mobile apparatus, which exchange language and/or data with a radio access network. For example, the wireless terminal is a device such as a Personal Communication Service (PCS) telephone, a cordless telephone, a Session Initiation Protocol (SIP) phone, a Wireless Local Loop (WLL) station, or a Personal Digital Assistant (PDA). The wireless terminal may also be referred to as a system, a subscriber unit, a subscriber station, a mobile station, a mobile console, a remote station, a remote terminal, an access terminal, a user terminal, a user agent, or a user device or user equipment. This is not limited herein.

An embodiment of the present disclosure further provides a computer readable storage medium, where the computer readable storage medium stores a computer program. When the computer program is executed by the processor, various processes of the embodiments of the method for controlling the bandwidth part inactivity timer are performed, and the same technical effect can be achieved. To avoid repetition, details are not described herein again. The computer readable storage medium is, for example, a Read-Only Memory (ROM), a Random Access Memory (RAM), a magnetic disk, or an optical disc.

A person of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided by the present disclosure, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected based on actual needs to achieve the objective of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer readable storage medium. Based on this understanding, the essence of the technical solutions of the present disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of the present disclosure. The storage medium includes various mediums, such as a USB flash disk, a removable hard disk, a ROM, a RAM, a magnetic disk, or an optical disc, that can store program code.

In addition, it should be noted that in the apparatuses and methods of the present disclosure, it is obvious that the components or the steps may be divided and/or recombined. These divisions and/or recombinations should be considered as equivalent solutions of the present disclosure. Moreover, the steps for performing the foregoing series of processing may be performed naturally in chronological order based on a described sequence, but do not necessarily need to be performed in chronological order, and some steps may be performed in parallel or independently. Those of ordinary skill in the art can understand that all or any of the steps or the components of the methods and the apparatuses of the present disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product is also included in the present disclosure, and a storage medium storing such a program product is also included in the present disclosure. Obviously, the storage medium may be any well-known storage medium or any storage medium to be developed in the future. It should be further noted that in the apparatuses and methods of the present disclosure, it is obvious that the components or the steps may be divided and/or recombined. These divisions and/or recombinations should be considered as equivalent solutions of the present disclosure. Moreover, the steps for performing the foregoing series of processing may be performed naturally in chronological order based on a described sequence, but do not necessarily need to be performed in chronological order, and some steps may be performed in parallel or independently.

Optional implementations of the present disclosure are described above. It should be noted that a person of ordinary skill in the art may further make several improvements and refinements without departing from the principles described in the present disclosure, and these improvements and refinements also fall within the protection scope of the present disclosure.

What is claimed is:

1. A method for controlling a bandwidth part inactivity timer, comprising:
   determining whether a work switching state of a secondary cell switches from an activated state to a non-activated state, wherein a Bandwidth Part (BWP) is currently activated on the secondary cell; and
   disabling, by a terminal when the work switching state switches from the activated state to the non-activated state while staying on the same BWP currently activated on the secondary cell, a bandwidth part inactivity timer corresponding to the BWP currently activated on the secondary cell.

2. The method according to claim 1, wherein disabling, by the terminal when the work switching state switches from the activated state to the non-activated state, the bandwidth part inactivity timer corresponding to the BWP currently activated on the secondary cell comprises:
   disabling, by the terminal when the work switching state switches from the activated state to a new state or a deactivated state, the bandwidth part inactivity timer corresponding to the BWP currently activated on the secondary cell.

3. The method according to claim 2, wherein disabling, by the terminal when the work switching state switches from the activated state to the new state, the bandwidth part inactivity timer corresponding to the BWP currently activated on the secondary cell comprises:
when the work switching state switches from the activated state to the new state, when the currently activated BWP is not a default BWP, stopping, by the terminal, the bandwidth part inactivity timer corresponding to the BWP currently activated on the secondary cell, or waiting for expiration of the bandwidth part inactivity timer corresponding to the BWP currently activated on the secondary cell, or setting, as expiration, the bandwidth part inactivity timer corresponding to the BWP currently activated on the secondary cell.

4. The method according to claim 2, wherein disabling, by the terminal when the work switching state switches from the activated state to a deactivated state, the bandwidth part inactivity timer corresponding to the BWP currently activated on the secondary cell comprises:
when the work switching state switches from the activated state to the deactivated state, when the currently activated BWP is not a default BWP, waiting, by the terminal, for expiration of the bandwidth part inactivity timer corresponding to the BWP currently activated on the secondary cell, or setting, as expiration, the bandwidth part inactivity timer corresponding to the BWP currently activated on the secondary cell.

5. The method according to claim 1, wherein determining a work switching state of a secondary cell for which a BWP is configured comprises:
when state switching signaling of the secondary cell is received or a timer for controlling state switching of the secondary cell expires, determining the work switching state of the secondary cell for which the BWP is configured.

6. The method according to claim 3, wherein the default BWP is a BWP to which the terminal switches when the terminal obtains no scheduling transmission instruction, or performs no unscheduled sending or receiving, or receives no bandwidth part switching control signaling within specified duration of the bandwidth part inactivity timer corresponding to the currently activated BWP.

7. The method according to claim 4, wherein the default BWP is a BWP to which the terminal switches when the terminal obtains no scheduling transmission instruction, or performs no unscheduled sending or receiving, or receives no bandwidth part switching control signaling within specified duration of the bandwidth part inactivity timer corresponding to the currently activated BWP.

8. The method according to claim 1, wherein the bandwidth part inactivity timer corresponding to the currently activated BWP is configured by a network device.

9. A terminal, comprising a memory, a processor, and a computer program that is stored in the memory and capable of running on the processor, wherein the computer program is executed by the processor to perform operations comprising:
determining whether a work switching state of a secondary cell switches from an activated state to a non-activated state, wherein a Bandwidth Part (BWP) is currently activated on the secondary cell; and
when the work switching state switches from the activated state to the non-activated state while staying on the same BWP currently activated on the secondary cell, disabling a bandwidth part inactivity timer corresponding to the BWP currently activated on the secondary cell.

10. The terminal according to claim 9, wherein the computer program is executed by the processor to perform operations further comprising:
when the work switching state switches from the activated state to a new state, disabling the bandwidth part inactivity timer corresponding to the BWP currently activated on the secondary cell; and
when the work switching state switches from the activated state to a deactivated state, disabling the bandwidth part inactivity timer corresponding to the BWP currently activated on the secondary cell.

11. The terminal according to claim 10, wherein the computer program is executed by the processor to perform operations further comprising:
when the work switching state switches from the activated state to the new state, when the currently activated BWP is not a default BWP, stopping the bandwidth part inactivity timer corresponding to the BWP currently activated on the secondary cell, or waiting for expiration of the bandwidth part inactivity timer corresponding to the BWP currently activated on the secondary cell, or setting, as expiration, the bandwidth part inactivity timer corresponding to the BWP currently activated on the secondary cell.

12. The terminal according to claim 10, wherein the computer program is executed by the processor to perform operations further comprising:
when the work switching state switches from the activated state to the deactivated state, when the currently activated BWP is not a default BWP, waiting for expiration of the bandwidth part inactivity timer corresponding to the BWP currently activated on the secondary cell, or setting, as expiration, the bandwidth part inactivity timer corresponding to the BWP currently activated on the secondary cell.

13. The terminal according to any claim 9, wherein the computer program is executed by the processor to perform operations further comprising:
when state switching signaling of the secondary cell is received or a timer for controlling state switching of the secondary cell expires, determining the work switching state of the secondary cell for which the BWP is configured.

14. The terminal according to claim 11, wherein the default BWP is a BWP to which the terminal switches when the terminal obtains no scheduling transmission instruction, or performs no unscheduled sending or receiving, or receives no bandwidth part switching control signaling within specified duration of the bandwidth part inactivity timer corresponding to the currently activated BWP.

15. The terminal according to claim 12, wherein the default BWP is a BWP to which the terminal switches when the terminal obtains no scheduling transmission instruction, or performs no unscheduled sending or receiving, or receives no bandwidth part switching control signaling within specified duration of the bandwidth part inactivity timer corresponding to the currently activated BWP.

16. The terminal according to claim 9, wherein the bandwidth part inactivity timer corresponding to the currently activated BWP is configured by a network device.

17. A non-transitory computer readable storage medium storing a program, when executed by a processor, causes the processor to implement a method for controlling a bandwidth part inactivity timer, the method comprising:

determining whether a work switching state of a secondary cell switches from an activated state to a non-activated state, wherein a Bandwidth Part (BWP) is currently activated on the secondary cell; and disabling, by a terminal when the work switching state switches from the activated state to the non-activated state while staying on the same BWP currently activated on the secondary cell, a bandwidth part inactivity timer corresponding to the BWP currently activated on the secondary cell.

18. The non-transitory computer readable storage medium according to claim 17, wherein disabling, by the terminal when the work switching state switches from the activated state to the non-activated state, the bandwidth part inactivity timer corresponding to the BWP currently activated on the secondary cell comprises:

disabling, by the terminal when the work switching state switches from the activated state to a new state or a deactivated state, the bandwidth part inactivity timer corresponding to the BWP currently activated on the secondary cell.

19. The non-transitory computer readable storage medium according to claim 18, wherein disabling, by the terminal when the work switching state switches from the activated state to the new state, the bandwidth part inactivity timer corresponding to the BWP currently activated on the secondary cell comprises:

when the work switching state switches from the activated state to the new state, when the currently activated BWP is not a default BWP, stopping, by the terminal, the bandwidth part inactivity timer corresponding to the BWP currently activated on the secondary cell, or waiting for expiration of the bandwidth part inactivity timer corresponding to the BWP currently activated on the secondary cell, or setting, as expiration, the bandwidth part inactivity timer corresponding to the BWP currently activated on the secondary cell.

20. The non-transitory computer readable storage medium according to claim 18, wherein disabling, by the terminal when the work switching state switches from the activated state to the deactivated state, the bandwidth part inactivity timer corresponding to the BWP currently activated on the secondary cell comprises:

when the work switching state switches from the activated state to the deactivated state, when the currently activated BWP is not a default BWP, waiting, by the terminal, for expiration of the bandwidth part inactivity timer corresponding to the BWP currently activated on the secondary cell, or setting, as expiration, the bandwidth part inactivity timer corresponding to the BWP currently activated on the secondary cell.

* * * * *